April 24, 1962
R. C. TAYLOR
3,030,668
METHOD OF PRODUCING CYLINDRICAL ARTICLES
Filed May 19, 1958
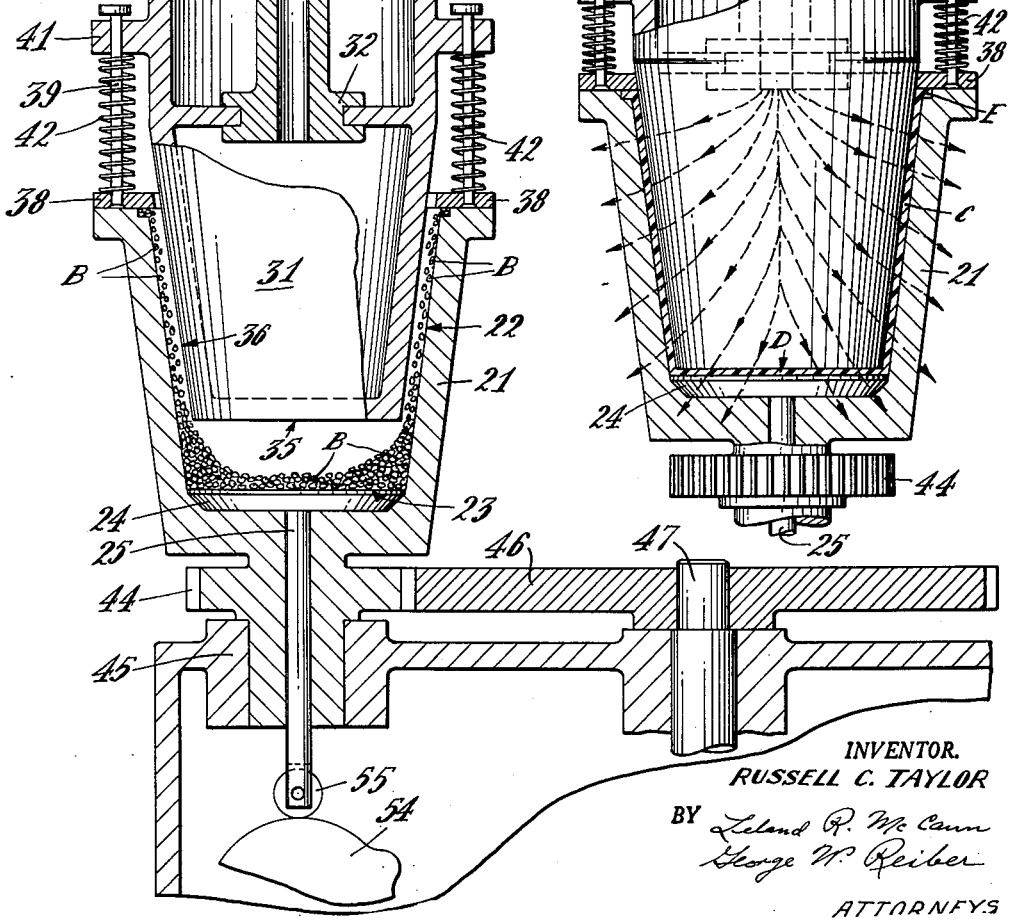
INVENTOR.
RUSSELL C. TAYLOR
BY Leland R. McCann
George W. Reiber
ATTORNEYS

United States Patent Office 3,030,668
Patented Apr. 24, 1962

3,030,668
METHOD OF PRODUCING CYLINDRICAL ARTICLES
Russell C. Taylor, Greenwich, Conn., assignor to American Can Company, New York, N.Y., a corporation of New Jersey
Filed May 19, 1958, Ser. No. 736,298
3 Claims. (Cl. 18—58.3)

The present invention relates to a method of producing hollow articles from granular plastic materials and has particular reference to arranging the materials into article producing shape prior to converting the material into a unitary structure.

Plastic articles such as drinking cups and the like have frequently been manufactured from granular plastic materials through the process of compacting the materials into a mold and then subjecting the compacted materials to a heat treatment which practically welds together the grains or pellets of the materials into a unity structure article. Simple as this process may be, it is often difficult to fill the mold uniformly with the granular material so as to produce a uniform thickness wall in the article, especially when it is desired to produce a thin wall article.

An object of the invention is to provide a rapid and economical method of producing hollow articles such as cups and the like from granular plastic materials, especially where a thin wall article is desired.

Another object is to provide a simple method of arranging the granular plastic material into article shape in readiness to convert the materials into a finished article.

Another object is to provide such a method wherein the granular materials are arranged into article producing shape through centrifugal action.

Numerous other objects and advantages of the invention will be apparent as it is better understood from the following description, which, taken in connection with the accompanying drawings, discloses a preferred embodiment thereof.

Referring to the drawings:

FIGURE 1 is a perspective view of an exemplary article produced in accordance with the steps of the instant method invention;

FIG. 2 is a sectional view through one form of apparatus for carrying out the steps of the instant method invention, the view illustrating a preparatory step in the method;

FIG. 3 is a view similar to FIG. 2 showing additional parts of the apparatus and illustrating the step of arranging the granular material in article producing formation; and FIG. 4 is a sectional view similar to FIGS. 2 and 3 and illustrating a step of heat treating the arranged granular material.

As a preferred and exemplary embodiment of the instant method invention, the drawings disclose the steps of producing a hollow cylindrical drinking cup A (FIG. 1) made from pellets B (FIG. 2) of a suitable granular plastic material such as prefoamed polystyrene beads or the like. However the invention is equally well adapted to other shaped articles and to the use of materials other than prefoamed polystyrene.

The cup A preferably is formed with a thin, inwardly tapered side wall C which at its lower edge merges into a flat bottom D. A slight outwardly projecting peripheral rim or flange E preferably is provided at the upper edge of the cup surrounding an open top or mouth F.

In accordance with the steps of the instant method invention an article shape defining space is provided and a measured quantity of pellets B of the granular material is compacted into the space by centifugal action until the space is filled. The compacted pellets B are then subjected to a heat treatment to weld them together into an integrated mass and then cooled to produce a unitary structure cup.

The article shape defining space is provided in any suitable manner, as for example in a two part mold, comprising a lower or mold body 21 (FIGS. 2, 3 and 4) having an open top, cup-shaped cavity defined by an inwardly tapered side wall 22 and a flat or other shaped bottom wall 23. The bottom wall 23 preferably constitutes the upper face of a vertically movable knockout pad 24, having a depending actuating stem 25 for use in ejecting the finished cup from the mold as will hereinafter be explained. At its upper edge, the mold body 21 preferably is formed with an annular groove or recess 27 to produce the rim E on the cup A.

Cooperating with the mold body 21, to provide the article shape defining space, is a plunger 31 (FIGS. 3 and 4) constituting a mold core, which is mounted, through a tongue and groove connection 32 for free rotation, on a vertically reciprocable actuating stem 33. The stem 33 may be reciprocated in any suitable manner.

The plunger 31 is provided with a flat bottom 35 and a tapered side wall 36 to correspond to the tapered side wall 22 of the mold body 21, and is of a peripheral dimension slightly less than the peripheral dimension of the body wall 22 by an amount substantially equal to the desired thickness of the side wall of the cup A, when the plunger 31 is fully positioned within the mold cavity as shown in FIG. 4. The plunger 31 preferably is provided with a surrounding ring 38 which is yieldably suspended from a plurality of travel limiting support rods 39 slidably carried in a flange 41 on the plunger 31 and surrounded by compression springs 42 to press the ring downwardly.

In the method of producing the cup A, a measured quantity of pellets B of the granular plastic material, i.e. sufficient pellets to produce the cup, is deposited in any suitable manner into the mold cavity of the mold body 21 as shown in FIG. 2. The plunger 31 is then partially inserted into the mold cavity, in axial alignment therewith, until the surrounding ring 38 seats against the top edge of the mold body 21 and overlies the cup rim recess 27 as shown in FIG. 3.

With the ring 38 in place on the mold body 21, the mold body is rapidly rotated and the plunger 31 is continued in its downward descent into the mold cavity. The mold body 21 is rotated in any suitable manner, such as by a gear 44 attached to the lower portion of the body and journaled in a suitable bearing bracket 45. The gear 44 is driven by a driving gear 46 secured to a driving shaft 47 rotated in any suitable manner and journaled in the bearing bracket 45.

This rapid rotation or spinning of the mold body 21 throws the pellets B of the granular plastic material outwardly by centrifugal action as shown in FIG. 3, against and upwardly along the defining side wall 22 of the mold cavity. The ring 38 prevents the pellets B from being thrown out of the mold cavity. While the mold body 21 is thus rotated, the plunger 31 continues its travel down into the mold cavity and thus gradually forms the article shape defining space. When the plunger 31 reaches the bottom of its stroke and is spaced away from the bottom 23 of the cavity a desired distance to define the bottom wall D of the cup A, the entire space along the side wall and along the bottom wall is completely defined and simultaneously through continued rapid rotation of the mold body, is completely filled with the pellets B in compacted relation. During this rotation of the mold body 21, the then frictionally connected plunger 31 is rotated therewith. It is for this purpose that the tongue and groove connection 32 is provided between the plunger and its vertically reciprocable actuating stem 33.

The cup A, including its rim E is thus fully formed through this centrifugal action but at this stage in the method it consists only of compacted pellets B. While in this form and preferably while the mold body 21 continues to rotate, the compacted pellets B are heat treated to weld them together into an integrated mass to provide a unitary structure cup A.

Heat treatment of the compacted pellets B may be effected in any suitable manner. By way of example, the drawings in FIG. 4 show steam being introduced into the plunger 31 by way of a channel 52 (FIG. 3) in the plunger actuating stem 33. The plunger 31 preferably is hollow and made of a porous metal which permits of the passage of the steam through its walls. For the same reason the mold body 21 is made of a porous metal so that the steam as it escapes from the plunger, passes through the compacted pellets B and then escapes through the porous walls of the mold body as best shown by the arrows in FIG. 4.

When the compacted pellets B are completely welded together, the steam treatment is terminated and a cooling medium, such as air is forced through the plunger and mold body walls to cool the welded mass. Following this cooling step, the plunger 31 is withdrawn and the completed cup A is ejected by manipulation of the ejecting pad 24 and its stem 25. This may be effected, by way of example through rotation of an edge cam 54 (FIG. 3) operating against a roller 55 on the lower end of the ejector pad stem 25.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. The method of producing a hollow plastic article such as a thin walled drinking cup and the like, comprising depositing a charge of discrete plastic pellets into the cavity of an upstanding hollow rotatable cup-shaped mold, confining the pellets within the mold against escape from the open end of the cavity by engaging an annular member with the upper periphery of the mold, providing a rotatable core of complemental cup-shape having an exterior surface for forming the interior surface of the hollow article desired, restricting said cavity adjacent the upper portion of the mold to a frusto-conical annular configuration by partially inserting said core through said member to dispose the major portion thereof within said mold with the lower end of the core adjacent the pellet charge to facilitate subsequent even distribution of said discrete pellets in the cavity, rotating said mold, core, and annular member to centrifugally distribute the pellets confined within said restricted cavity along and around the bottom and wall of said mold, further restricting said cavity throughout the mold to a frusto-conical configuration adjacent the wall thereof and a disc-like configuration adjacent the bottom of the mold by fully inserting said core into said mold simultaneously with rotation thereof to limit the thickness of the pellet material being distributed therein, and heating the pellets thus confined between the mold and core to weld the pellets into an integrated mass constituting the thin fused leakproof side and bottom walls of said hollow article.

2. The method of claim 1 wherein said core is hollow and the walls of said mold and core are porous, and said heating comprises passing steam into said core and thence outwardly through said porous core and mold walls and through the interposed compacted pellets of plastic material to weld the same together as an integrated mass.

3. The method of claim 1, and cooling the completed heat treated hollow cylindrical article prior to ejecting the same vertically from said cup-shaped mold.

References Cited in the file of this patent

UNITED STATES PATENTS

| | | |
|---|---|---|
| 216,311 | Couch | June 10, 1879 |
| 296,097 | Woeber | Apr. 1, 1884 |
| 951,483 | Matthews | Mar. 8, 1910 |
| 1,602,598 | Stebbens | Oct. 12, 1926 |
| 2,218,804 | Baird | Oct. 22, 1940 |
| 2,454,847 | Slack | Nov. 30, 1948 |
| 2,572,511 | Palmquist | Oct. 23, 1951 |
| 2,633,605 | Brucker | Apr. 7, 1953 |
| 2,728,169 | Spengler et al. | Dec. 27, 1955 |
| 2,787,809 | Stastny | Apr. 9, 1957 |

OTHER REFERENCES

"Dylite Expandable Polystyrene," Koppers Co. Inc., copyright, 1954, page 19.